United States Patent
Pan et al.

(10) Patent No.: US 10,364,778 B2
(45) Date of Patent: Jul. 30, 2019

(54) COMPOSITE INTAKE SYSTEM AND METHOD OF THE ROTARY ENGINE WITH VARIABLE INTAKE MANIFOLD

(71) Applicant: JIANGSU UNIVERSITY, Jiangsu (CN)

(72) Inventors: Jianfeng Pan, Jiangsu (CN); Wei Chen, Jiangsu (CN); Baowei Fan, Jiangsu (CN); Qingbo Lu, Jiangsu (CN); Yao Lu, Jiangsu (CN)

(73) Assignee: JIANGSU UNIVERSITY (CN)

( * ) Notice: Subject to any disclaimer, the term of this patent is extended or adjusted under 35 U.S.C. 154(b) by 273 days.

(21) Appl. No.: 15/516,873

(22) PCT Filed: Mar. 16, 2016

(86) PCT No.: PCT/CN2016/076437
§ 371 (c)(1),
(2) Date: Apr. 4, 2017

(87) PCT Pub. No.: WO2017/143633
PCT Pub. Date: Aug. 31, 2017

(65) Prior Publication Data
US 2018/0274501 A1    Sep. 27, 2018

(30) Foreign Application Priority Data

Feb. 26, 2016 (CN) .......................... 2016 1 0109792

(51) Int. Cl.
*F02M 35/10*    (2006.01)
*F02M 53/04*    (2006.01)
(Continued)

(52) U.S. Cl.
CPC ........... *F02M 35/1085* (2013.01); *F01C 1/00* (2013.01); *F01C 1/22* (2013.01); *F01C 21/18* (2013.01);
(Continued)

(58) Field of Classification Search
CPC ....... F02M 35/10091; F02M 35/10144; F02M 35/10118; F02M 35/104; F02B 53/04; F02B 53/06; F01C 21/18; F02D 9/12
(Continued)

(56) References Cited

U.S. PATENT DOCUMENTS 3,915,126 A * 10/1975 Kishimoto .............. F02B 53/04
                                                           123/219
4,566,412 A *  1/1986 Tadokoro ................ F01C 21/18
                                                           123/216
2013/0263811 A1* 10/2013 Sato .................... F02M 35/1255
                                                           123/184.57

FOREIGN PATENT DOCUMENTS

CN    101571073    11/2009    ............. F02D 9/12
CN    101699047     4/2010    ............. F02D 9/10
(Continued)

*Primary Examiner* — Deming Wan
(74) *Attorney, Agent, or Firm* — Hayes Soloway P.C.

(57) ABSTRACT

A composite intake system and method of operating a rotary engine with variable intake manifold is provided. The system includes two switching valves in a secondary intake switching tube to change the intake method. When the rotary engine works under low speed conditions, it adopts the long intake manifold and the side-intake mode. When the rotary engine works under medium and high speed conditions, it uses the short intake manifold and the composite-intake mode. When the rotary engine works under ultra high speed conditions, it takes the short intake manifold and the peripheral-intake mode.

7 Claims, 1 Drawing Sheet

(51) Int. Cl.
*F02M 53/06* (2006.01)
*F01C 21/18* (2006.01)
*F02D 9/12* (2006.01)
*F02M 35/104* (2006.01)
*F02M 35/108* (2006.01)
*F02B 53/06* (2006.01)
*F02M 35/02* (2006.01)
*F01C 1/00* (2006.01)
*F02B 53/04* (2006.01)
*F01C 1/22* (2006.01)
*F02D 9/10* (2006.01)

(52) U.S. Cl.
CPC .............. *F02B 53/04* (2013.01); *F02B 53/06* (2013.01); *F02D 9/12* (2013.01); *F02M 35/02* (2013.01); *F02M 35/104* (2013.01); *F02M 35/10111* (2013.01); *F02D 9/10* (2013.01); *F02D 9/109* (2013.01)

(58) Field of Classification Search
USPC ........................................................ 123/200
See application file for complete search history.

(56) References Cited

FOREIGN PATENT DOCUMENTS

| | | | | |
|---|---|---|---|---|
| CN | 101769205 | 7/2010 | ................ | F01L 1/14 |
| CN | 103883443 | 6/2014 | ................ | F02D 9/02 |
| EP | 0856649 | 8/1998 | .............. | F02B 29/00 |

\* cited by examiner

US 10,364,778 B2

COMPOSITE INTAKE SYSTEM AND METHOD OF THE ROTARY ENGINE WITH VARIABLE INTAKE MANIFOLD

TECHNICAL FIELD

The invention pertains to the technical field of air intake technique of internal combustion engine. It involves a kind of composite intake system and method of the rotary engine with variable intake manifold.

BACKGROUND

The engine needs different air intake volume under different revolving speed conditions. While the engine runs under low speed conditions, using a long inlet manifold can increase the air flow speed and pressure, which is conducive to the formation of intake vortex, oil and gas mixing and fuel atomization, thereby enhancing the torque. When the engine runs under high speed conditions, adapting a short intake manifold can shorten the admission stroke, increase the inertia of the air flow, smoothly promote the fresh gas into the cylinder and supply more fresh air to the engine, which is conducive for sufficient combustion in the cylinder and improvement of the output power. The opening and closing of the intake port of the side-ported rotary engine is controlled by the position of rotor side face during the rotation process. There is an abrupt structure in the intake port, so the valve-opening duration angle is small, the intake resistance is large and the charge coefficient is small, which is suitable for low speed conditions. However, the intake port of the peripheral-ported rotary engine is designed on the cylinder body directly, so the inlet airflow direction is generally not abrupt, the air resistance is small and the charge coefficient is large, which is suitable for high speed conditions. In addition, the rotary engine can achieve higher operating speed, so the revolving speed range is wide. Therefore, there are still some technical problems that need to be solved on how to design the intake manifold length, reasonably use the advantages of the side and peripheral-ported rotary engines, provide a suitable intake method and improve the engine intake efficiency under various operating conditions.

Therefore, for the above-mentioned related issues, it is necessary to design a composite intake mode with variable intake manifold to meet the different requirements of the air intake volume of the rotary engine.

SUMMARY

This invention aims to realize a technique which has the variable intake manifold and the composite-intake mode for the rotary engine. By changing the length of the intake manifold to match the side-intake mode, peripheral-intake mode and composite-intake mode, and making full use of the advantages of the different intake manifold length and intake methods. Thence, it can meet the different requirements of the air intake volume of the rotary engine under various operating conditions and improve the engine intake efficiency.

The technical proposal of the present invention is as follows:

The features of the composite intake system of the rotary engine with variable intake manifold are as follows: The system includes air cleaner, intake manifold, primary intake switching tube, variable intake manifold, secondary intake switching tube, side-intake manifold, peripheral-intake manifold, middle partition, cylinder body, rotor, speed sensor and controller (ECU). The rotor is arranged in the cylinder body. The peripheral-intake port and the peripheral-exhaust port are distributed at the peripheral-wall of the cylinder body. Besides, the middle partition is fixed on the side face of the cylinder body and located between two rotors. The side-intake port is arranged in the middle partition. The primary intake switching tube is connected with air cleaner by the intake manifold. The variable intake manifold includes a short intake manifold and a long intake manifold which are connected with the primary intake switching tube. The first valve which is used to control the intake manifold to connect with the short intake manifold or the long intake manifold is installed in the primary intake switching tube. The other end of the secondary intake switching tube is connected with the side-intake manifold and peripheral-intake manifold, the conduction between them is controlled by the second valve and the third valve which are arranged in the secondary intake switching tube. The side-intake manifold and peripheral-intake manifold are also respectively connected with the side-intake port and peripheral-intake port. The speed sensor is mounted on the flywheel. It is connected with the ECU to detect the rotational speed of the rotor and transmit the rotational speed signal to the ECU. The ECU is also connected with the first valve, the second valve and the third valve to control their opening and closing according to the rotor speed.

Furthermore, the first valve is a sheet-like structure. The short intake manifold is located on the left side of the primary intake switching tube while the long intake manifold is located on the other side. In addition, the short intake manifold shares the same horizontal center line with the primary intake switching tube, while the long intake manifold is located at the upper location. In addition, the first valve is fixed at the nozzle of the short intake manifold.

Furthermore, the second valve and the third valve are a sheet-like structure. The second valve is fixed at the joint of the secondary intake switching tube and the side-intake manifold. The third valve is fixed at the joint of secondary intake switching babe and the peripheral-intake manifold Meanwhile, this position is close to the side-intake manifold and peripheral-intake manifold.

Furthermore, in the primary intake switching tube, the port of short intake manifold is inserted at the right side of the side-wall surface. Simultaneously, the port of long intake manifold port is inserted in the left of the upper-wall surface, and the direction is perpendicular to the orientation of airflow movement.

Furthermore, the variable intake manifold is connected with the secondary intake switching tube. The short intake manifold shares a common pipe, which has a rotating shape with the long intake manifold. The form of the joint, which connects common pipe and short intake manifold is circular arc. The diameter of the short intake manifold is larger than that of the long intake manifold.

The intake manifold and the primary intake switching tube are connected by the primary connecting flange. The variable intake manifold and the secondary intake switching tube are connected by secondary connecting flange. The side-intake manifold and the peripheral-intake manifold are connected with the cylinder block and middle partition by the third connecting flange.

The intake methods of a composite intake system of the rotary engine with variable intake manifold, and the characteristic is that the rotational speed sensor detects the rotational speed of the rotor in real-time and transmits the signal to the ECU. The ECU controls the intake method according to the rotational speed as follows:

When the rotor speed is less than 2000 r/min, namely, the low speed conditions, ECU controls the first valve to open the intake manifold and long intake manifold. At the same time, it also controls the second valve (the third valve is closed) to open the secondary intake switching tube the side-intake manifold. In other words, the long intake manifold and the side-intake method are used.

When the rotor speed is 2000 r/min-5000 r/min, namely, the medium and high speed conditions, ECU controls the first valve to open the intake manifold and short intake manifold. It also controls the second valve and the third valve to connect the secondary intake switching tube with the side-intake manifold and peripheral-intake manifold. In other words, the short intake manifold and the composite intake method are adopted.

When the rotor speed is greater than 5000 r/min, namely, the ultra high speed conditions, ECU controls the first valve to open the intake manifold and short intake manifold. At the same time, it also controls the second valve (the third valve is closed) to open the secondary intake switching tube the peripheral-intake manifold. In other words, the short intake manifold and the peripheral intake method are taken.

The beneficial effects of the invention are mainly as follows: The rotary engine usually processes a wide rotational speed range, thus the requirement of different air intake amount should be fully considered. This invention achieves reasonable air intake method by taking advantages of the variable intake manifold matches up with side-intake method, peripheral-intake method and composite intake method. Specifically, the first valve in the primary intake switching tube can change the length of the variable intake manifold. The short intake manifold and long intake manifold are arranged in different ways and locations. Such as, the port of the short intake manifold is inserted into the side-wall surface of the primary intake switching tube from right side. Differently, the port of long intake manifold is inserted in the upper-wall surface of the primary intake switching tube from left side. Meanwhile, a short tube is inserted into the inside of the primary intake switching tube and the direction is perpendicular to the air flow direction. This design can ensure that most of the air is able to flow from the short intake manifold successfully under the high speed conditions. The second and third valve in the second intake switching tube can realize the conversion of the side-intake method and the peripheral-intake method. ECU controls the opening and closing time of the second and third valve according to different speed conditions, thereby, realize the free switching of the intake method. In summary, the long intake manifold and the side-intake method are used under low speed conditions. The short intake manifold and the composite intake method are adopted under medium and high speed conditions. The short intake manifold and the peripheral-intake method are taken under ultra high speed conditions. And in this way, it can realize the change of the intake manifold length and the intake method at different revolving speed, then improve the intake efficiency.

In the figures:
1. Air cleaner, 2.Intake manifold, 3.Primary intake switching tube, 3-1.First valve, 4.Variable intake manifold, 4-1.Short intake manifold, 4-2.Long intake manifold, 5.Secondary intake switching tube, 5-1.Second valve, 5-2.Third valve, 6.Side-intake manifold, 7.Peripheral-intake manifold, 8.Middle partition, 9.Cylinder body, 10. Side-intake port, 11.Peripheral-intake port, 12.First connection flange, 13.Second connection flange, 14.Third connection flange, 15.Rotor, 16.Peripheral-exhaust port.

DETAILED DESCRIPTION

The present invention will now be further described with reference to the drawings and specific embodiments, but the scope of this patent is not limited to these contents.

Figure 1:
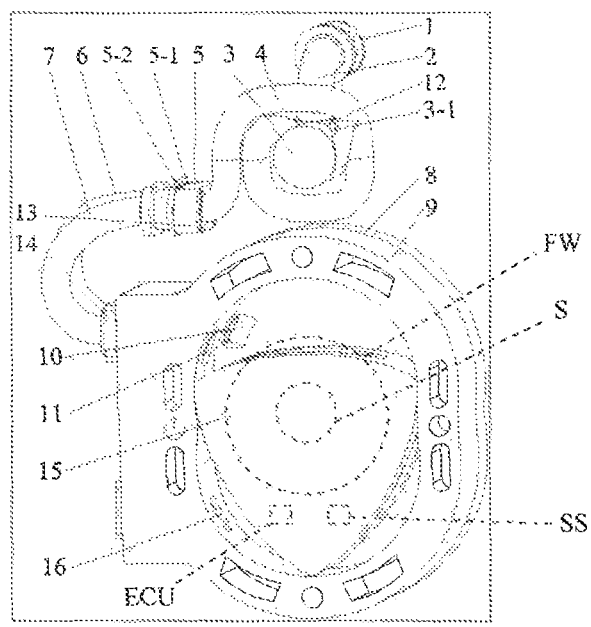
FIG. 1 is the schematic of the composite intake system of the rotary engine with variable intake manifold.
Figure 2:
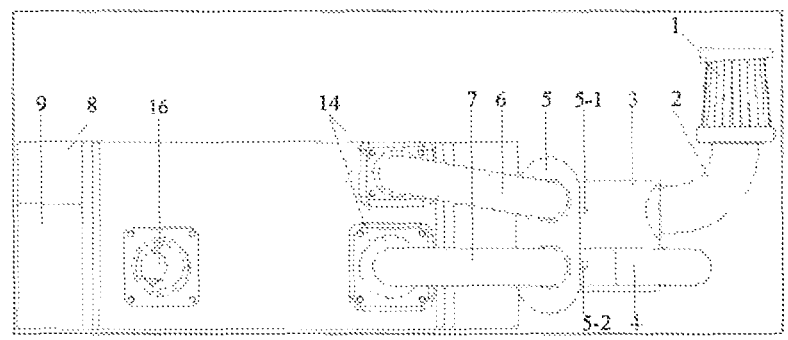
FIG. 2 is a left view illustrating the composite intake system of the rotary engine with variable intake manifold.

As shown in FIGS. 1 and 2, a composite intake system of the rotary engine with variable intake manifold includes an air cleaner 1, an intake manifold 2, a primary intake switching tube 3, a variable intake manifold 4, and a secondary intake switching tube 5, side-intake manifold 6, peripheral-intake manifold 7, middle partition 8, cylinder body (9) and rotor 15. The side wall of the cylinder body 9 is provided with a side-intake port 10. The peripheral wall of the cylinder body 9 is provided with a peripheral-intake port 11 and a peripheral-exhaust port 16 respectively. The rotor 15 is installed in the cylinder body 9. The middle partition 8 is fixed to the cylinder body 9 and is located between the two rotors. The primary intake switching tube 3 connects with the air cleaner 1 through the intake manifold 2. The variable intake manifold 4 includes a short intake manifold 4-1 and a long intake manifold 4-2. One end is connected to the primary intake switching tube 3. The first valve 3-1 which is used to control the intake manifold to connect with the short intake manifold or the long intake manifold is arranged in the primary intake switching tube. And the other end of the secondary intake switching tube is connected with the side-intake manifold (6) and peripheral-intake manifold 7, the conduction between them is respectively controlled by the secondary valve 5-1 and the third valve 5-2 which are arranged in the secondary intake switching tube 5. The side-intake manifold and peripheral-intake manifold are also respectively connected with the side-intake port 10 and peripheral-intake port 11 at the other end. In order to facilitate the disassembling and assembling of the system, the intake manifold 2 is connected to the primary intake switching tube 3 through a first connection flange 12. The variable intake manifold 4 and secondary intake switching tube 5 are connected to each other through a second connection flange 13. The side-intake manifold 6 and peripheral-intake manifold 7 are respectively connected to the middle partition 8 and the cylinder body 9 through a third connection flange 14.

The first valve in the primary intake switching tube 3 enables the length of the different intake manifolds switch rapidly. Meanwhile, the second valve and third valve in the second intake switching tube 5 enables the free conversion and combination of the side intake method and peripheral intake method.

At the same time, this invention also includes a speed sensor SS and an ECU (shown in phantom), the speed sensor is arranged at the shaft S and flywheel FW (also shown in phantom) to real-time detect the rotational speed of the rotor. The speed sensor is connected to the ECU, which is also connected to the first valve, the second valve and the third valve. Moreover, the speed sensor transmits the detected rotor speed to the ECU in real time, then ECU according to the rotor speed to control the air intake manifold and intake method.

Figure 3:
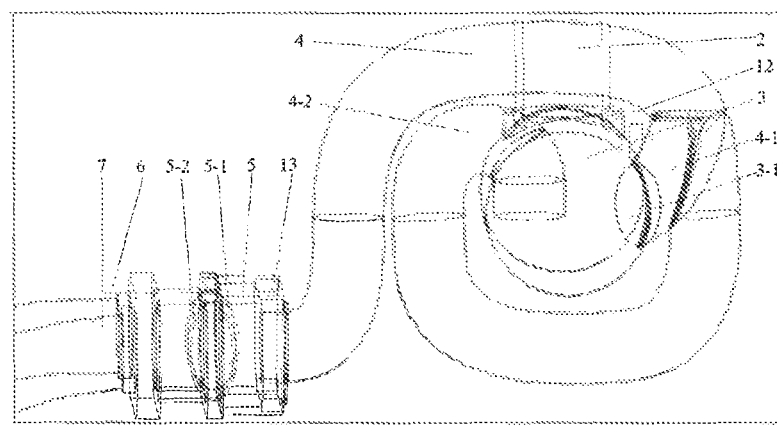
FIG. 3 is the partial internal perspective view illustrating the composite intake system of the rotary engine with variable intake manifold.

As shown in FIG. 1, 2 and 3, in this embodiment, the first valve 3-1 is a sheet-like structure. The short intake manifold 4-1 is located on the left side of the primary intake switching tube 3 while the long intake manifold 4-2 is located on the other side. The short intake manifold shares the same horizontal center line with the primary intake switching tube, but the long intake manifold is at the upper location. In addition, the first valve is fixed at the nozzle of the short intake manifold. In FIG. 3, in the inside of primary intake switching tube, the inlet position and direction of the short intake manifold and the long intake manifold are designed differently. Among them, the intake port of the short intake manifold is inserted into the side-wall surface of the primary intake switching tube. Simultaneously, the long intake manifold 4-2 is inserted in the left of the upper-wall surface of the primary intake switching tube. And its direction "D"is perpendicular to the orientation of airflow movement. The short intake manifold and the long intake manifold have a common tube with a rotating shape. To avoid excessive air flow and to ensure high-speed airflow through the short intake manifold smoothly, the common pipe is designed to connect with the short intake manifold by arc excessive way. Furthermore, the diameter of the short intake manifold is designed larger than that of the long intake manifold. The second valve and the third valve are sheet-like structures respectively fixed to the junction of the secondary intake switching tube and the end surface intake manifold and the peripheral intake manifold. The second valve 5-1 and the third valve 5-2 are fixed at the joint of the second intake switching tube 5 between the side-intake manifold 6 and peripheral-intake manifold 7. This position is close to the side of side-intake manifold and peripheral-intake manifold.

When the side-intake method is adopted, firstly, the air flow flows from the intake manifold 2 into the primary intake switching tube 3, then the gas flows into the long intake manifold 4-2 (the first valve 3-1 is closed). Secondly, the gas in the secondary intake switching pipe 5 enters the side-intake manifold 6 (the second valve 5-1 is opened and the third valve 5-2 is closed). Finally, the gas enters the cylinder through the side-intake port 10. When the peripheral-intake method is adopted, firstly, the air flows from the intake manifold 2 into the primary intake switching tube 3, then the gas flows into the short intake manifold 4-1 (the first valve 3-1 is opened). Secondly, the gas in the secondary intake switching pipe 5 enters the peripheral-intake manifold 7 (the second valve 5-1 is closed and the third valve 5-2 is opened). Finally, the gas enters the cylinder through the peripheral-intake port 11. When the composite intake method is adopted, firstly, the gas flows into the short intake manifold 4-1 (the first valve 3-1 is opened). Then, the gas in the secondary intake switching pipe 5 enters the side-intake manifold 6. Finally, the gas can not only flow through the side-intake manifold and the side-intake port, but also through the peripheral-intake manifold and the peripheral-intake port into the cylinder (the second valve 5-1 is opened and the third valve 5-2 is opened).

Adopting different intake methods on the basis of rotor speed can take full advantage of the side-intake method (high-torque output at low speed) and the peripheral-intake method (high-power output at high speed). When the rotary engine runs under low speed conditions, the air flow through the long intake manifold 4-2 and match up with the side-intake method. Under medium and high speed conditions, the air flow through the short intake manifold 4-1 and match up with the composite intake method (side-intake method and peripheral-intake method). Under ultra high speed conditions, the air flow through the short intake manifold 4-1 and match up with the side-intake method.

The intake methods of a composite intake system of the rotary engine with variable intake manifold. The details are as follows.

The rotational speed sensor detects the rotational speed of the rotor 15 in real-time and transmits the signal to the ECU. The ECU controls the intake method according to the rotational speed as follows:

When the rotor speed is less than 2000 r/min (low speed operation), the ECU controls the first valve 3-1 to close. Then the intake manifold 2 is connected to the long intake manifold 4-2. In the meantime, the ECU controls the second valve 5-1 to open and the third valve 5-2 to close. So the secondary intake switching pipe 5 is connected to the side-intake manifold 6. At this time, the air flow passes from the long intake manifold 4-2 to the secondary intake switching pipe 5. Then it flows through the side-intake manifold 6 and the side-intake port 10, finally into the cylinder. That is to say, the long intake manifold 4-2 is used and the side-intake method is adopted.

When the rotor speed is 2000 r/min-5000 r/min (medium and high speed operation), the ECU controls the first valve 3-1 to open. As a result, the intake manifold 2 is connected to the short intake manifold 4-1. Meanwhile, the ECU controls both of the second valve 5-1 and the third valve 5-2 to open. The secondary intake switching pipe 5 is connected to the side-intake manifold 6 and the peripheral-intake manifold 7 at the same time. In this case, the air flow passes from the short intake manifold 4-1 to the secondary intake switching pipe 5. There are two intake routes, one route is from the side-intake manifold 6 and the side-intake port 10 to the cylinder, the other one is from the peripheral-intake manifold 7 and the peripheral-intake port 11 to the cylinder. That is to say, the short intake manifold 4-1 is used and the composite intake method is adopted.

When the rotor speed is greater than 5000 r/min (ultra high speed operation), the ECU controls the first valve 3-1 to open, then the intake manifold 2 is connected to the short intake manifold 4-1. The ECU controls the second valve 5-1 to close and the third valve 5-2 to open. The secondary intake switching pipe 5 is connected to the peripheral-intake manifold 7. And the air flow passes from the short intake manifold 4-1 to the secondary intake switching pipe 5. Then it flows through the peripheral-intake manifold 7 and the peripheral-intake port 10, finally into the cylinder. That is to say, the short intake manifold 4-1 is used and the peripheral-intake method is adopted.

The above-described embodiment is a preferred scheme of the present invention, but the invention is not limited to this embodiment. Without departing from the spirit of this patent, any conceivable modifications, substitutions or variations that can be made by the technical staff in the field are within the scope of the present invention.

The invention claimed is:

1. A composite intake system of a rotary engine having a flywheel, said composite intake system comprising an air cleaner, an intake manifold, a primary intake switching tube, a variable intake manifold, a secondary intake switching tube, a side-intake manifold, a peripheral-intake manifold, a middle partition, a cylindrical body, a rotor, a speed sensor and controller (ECU); wherein a peripheral-intake port and a peripheral-exhaust port are distributed at a peripheral-wall of the cylindrical body, a side-intake port is arranged in the middle partition; the rotor is arranged in the cylindrical body; the middle partition, is fixed on a side face of the cylindrical body and located between the side face of the cylindrical body and the rotor; the primary intake switching tube is connected with the air cleaner via the intake manifold; the variable intake manifold includes a short intake manifold and a long intake manifold; the short intake manifold and the long intake manifold are connected with the primary intake switching tube at one end; first valve is arranged in the primary intake switching tube which is used to control the intake manifold to connect with the at least one of one end of the short intake manifold and the long intake manifold; the other end of short intake manifold and the long intake manifold is connected with the secondary intake switching tube; other end of the secondary intake switching tube is connected with the side-intake manifold and the peripheral-intake manifold, and another end of the side-intake manifold is connected with the side-intake port and another end of the peripheral-intake manifold is connected with the peripheral-intake port; the connection between the secondary intake switching tube and the side-intake manifold is controlled by a secondary valve and the connection between the secondary intake switching tube and the peripheral-intake manifold is controlled by a third valve; wherein the secondary valve and the third valve are arranged in the secondary intake switching tube; the speed sensor is mounted on the flywheel and it is connected with the ECU to detect a rotational speed of the rotor and transmit rotational speed signal to the ECU; and the ECU is connected with the first valve, the second valve and the third valve to control their opening and closing according to the rotational speed of the rotor.

2. The system according to claim 1, wherein the first valve is a sheet-like structure: the short intake manifold is located on one side of the primary intake switching tube while the long intake manifold is located on the other side; the short intake manifold shares a same horizontal center line with the primary intake switching tube while the long intake manifold is at an upper location; and the first valve is fixed at a nozzle of the short intake manifold.

3. The system according to claim 1, wherein the second valve and the third valve are a sheet-like structure; they are fixed at a joint between the secondary intake switching tube and the side-intake manifold and the peripheral-intake manifold, at a position close to the side-intake manifold and the peripheral-intake manifold.

4. The system according to claim 2, wherein in the primary intake switching tube, a port of the short intake manifold is inserted at one side-wall surface of the primary intake switching tube; a port of the long intake manifold is inserted in the side-wall surface of the primary intake switching tube, and a direction of the long intake manifold is perpendicular to an orientation of airflow movement.

5. The system according to claim 1, wherein the variable intake manifold is connected with the secondary intake switching tube; the short intake manifold shares a common pipe, which has a rotating shape, with the long intake manifold; an arc-over-form is used at joint of the common pipe and the short intake manifold; and a diameter of the short intake manifold is larger than that of the long intake manifold.

6. The system according to claim 1, wherein the intake manifold and the primary intake switching tube are connected by a primary connecting flange; the variable intake manifold and the secondary intake switching tube are connected by a second connecting flange; the side-intake manifold and the peripheral-intake manifold are connected with the middle partition and the cylindrical body by a third connecting flange.

7. A method of operating the composite intake system for the rotary engine as claimed in claim 1, wherein the speed sensor monitors a real-time revolving speed of the rotor, and then the real-time revolving speed signal is sent to the ECU; wherein different kinds of air intake methods that the ECU conducts via revolving speed of the rotor are as follows:

when the revolving speed of the rotor is below 2000 r/min, the rotary engine works under low speed conditions; the ECU controls the first valve to connect the Intake manifold with the long intake manifold, and the second valve (the third valve is closed) to connect the second intake switching tube with the side-intake manifold; in other words, the long intake manifold and the side-intake manifold are used;

when the revolving speed of the rotor is between 2000 r/min and 5000 r/min, the rotary engine works under medium and high speed conditions; the ECU controls the first valve to connect the intake manifold with the short intake manifold, concurrently regulates the second valve and the third valve to connect the second intake switching tube with the side-intake manifold and the peripheral-intake manifold; in other words, the short intake manifold and the side intake manifold are used; and When the revolving speed of the rotor is more than 5000r/min, the rotary engine works under ultra high speed conditions; the ECU controls the first valve to connect the intake manifold with the short intake manifold, and the third valve (the second valve is closed) to connect the second intake switching tube with the peripheral-intake manifold; in other words, the short intake manifold and the peripheral intake manifold are used.

* * * * *